(12) United States Patent
Wingfield et al.

(10) Patent No.: US 11,396,925 B2
(45) Date of Patent: Jul. 26, 2022

(54) CABLE CHAIN FOR USE IN CABLE MANAGEMENT

(71) Applicant: Dell Products L.P., Round Rock, TX (US)

(72) Inventors: Megan Wingfield, Madison, AL (US); Bernard D. Strmiska, Round Rock, TX (US); Robert B. Curtis, Georgetown, TX (US); Destin Ray, Cypress, TX (US); Matthew Parmlee, Bullard, TX (US); Elliot Le, New Braunfels, TX (US); Henry Gomez, Houston, TX (US); William Beck, San Antonio, TX (US)

(73) Assignee: Dell Products L.P., Round Rock, TX (US)

( * ) Notice: Subject to any disclaimer, the term of this patent is extended or adjusted under 35 U.S.C. 154(b) by 376 days.

(21) Appl. No.: 16/787,609

(22) Filed: Feb. 11, 2020

(65) Prior Publication Data
US 2021/0246967 A1    Aug. 12, 2021

(51) Int. Cl.
*F16G 13/00* (2006.01)
*F16G 13/16* (2006.01)
(52) U.S. Cl.
CPC .................................. *F16G 13/16* (2013.01)
(58) Field of Classification Search
CPC ...................................................... F16G 13/16

USPC ...................................... 59/78.1, 84; 174/68.2
See application file for complete search history.

(56) References Cited

U.S. PATENT DOCUMENTS

| | | | | |
|---|---|---|---|---|
| 6,161,373 A * | 12/2000 | Heidrich | ................. | F16L 3/015 |
| | | | | 59/900 |
| 6,167,689 B1 * | 1/2001 | Heidrich | .............. | H02G 3/0475 |
| | | | | 59/900 |
| 7,418,812 B2 * | 9/2008 | Ikeda | ...................... | F16G 13/16 |
| | | | | 248/51 |
| 8,674,222 B2 * | 3/2014 | Hsieh | ...................... | F16L 3/015 |
| | | | | 174/68.2 |
| 9,404,557 B2 * | 8/2016 | Kaihotsu | .............. | H02G 11/006 |
| 11,309,696 B2 * | 4/2022 | Zhang | .................. | H02G 3/0437 |

\* cited by examiner

*Primary Examiner* — Todd M Epps
(74) *Attorney, Agent, or Firm* — Jackson Walker L.L.P.

(57) ABSTRACT

A cable assembly may include a cable communicatively coupling a first information handling resource to a second information handling resource and a cable chain for guiding a routing of the cable, the cable chain comprising a plurality of cable chain links. Each cable chain link may include a plurality of coupling features for rotatably coupling, about an axis, such cable chain link to another cable chain link, one or more limiting features for limiting a rotation of such cable chain link to the other cable chain link, and an opening formed in such cable chain link and configured such that the cable chain has a lengthwise opening along one side of the cable chain which forms a channel for receiving the cable.

20 Claims, 11 Drawing Sheets

CABLE CHAIN FOR USE IN CABLE MANAGEMENT

TECHNICAL FIELD

The present disclosure relates in general to information handling systems, and more particularly to a cable chain for use in managing a cable in an information handling system chassis.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many applications, one or multiple information handling servers may be installed within a single chassis, housing, enclosure, or rack. Communication between servers and/or between enclosures or even within the same enclosure or same rack may often be accomplished via cables.

As server computing density increases over time, the need to expand server depth to allow for more components and increased airflow is becoming more critical. As such density increases, it may still be desirable that users maintain the ability to hot swap components of information handling systems and the ability to adjust their rack or rail server setups.

SUMMARY

In accordance with the teachings of the present disclosure, the disadvantages and problems associated with existing approaches to cable management in an information handling system chassis may be reduced or eliminated.

In accordance with embodiments of the present disclosure, a system may include a first information handling resource, a second information handling resource, and a cable assembly comprising a cable communicatively coupling the first information handling resource to the second information handling resource and a cable chain for guiding a routing of the cable, the cable chain comprising a plurality of cable chain links. Each cable chain link may include a plurality of coupling features for rotatably coupling, about an axis, such cable chain link to another cable chain link, one or more limiting features for limiting a rotation of such cable chain link to the other cable chain link, and an opening formed in such cable chain link and configured such that the cable chain has a lengthwise opening along one side of the cable chain which forms a channel for receiving the cable.

In accordance with these and other embodiments of the present disclosure, a cable assembly may include a cable communicatively coupling a first information handling resource to a second information handling resource and a cable chain for guiding a routing of the cable, the cable chain comprising a plurality of cable chain links. Each cable chain link may include a plurality of coupling features for rotatably coupling, about an axis, such cable chain link to another cable chain link, one or more limiting features for limiting a rotation of such cable chain link to the other cable chain link, and an opening formed in such cable chain link and configured such that the cable chain has a lengthwise opening along one side of the cable chain which forms a channel for receiving the cable.

In accordance with these and other embodiments of the present disclosure, a cable chain for guiding a routing of a cable may include a plurality of cable chain links, each cable chain link comprising a plurality of coupling features for rotatably coupling, about an axis, such cable chain link to another cable chain link, one or more limiting features for limiting a rotation of such cable chain link to the other cable chain link, and an opening formed in such cable chain link and configured such that the cable chain has a lengthwise opening along one side of the cable chain which forms a channel for receiving a cable.

In accordance with these and other embodiments of the present disclosure, a cable chain link may include a plurality of coupling features for rotatably coupling, about an axis, such cable chain link to another cable chain link to form at least a portion of a cable chain, one or more limiting features for limiting a rotation of such cable chain link to the other cable chain link, and an opening formed in such cable chain link and configured such that the cable chain has a lengthwise opening along one side of the cable chain which forms a channel for receiving a cable.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4D, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, air movers, sensors, power supplies, and/or any other components and/or elements of an information handling system.

Figure 1:
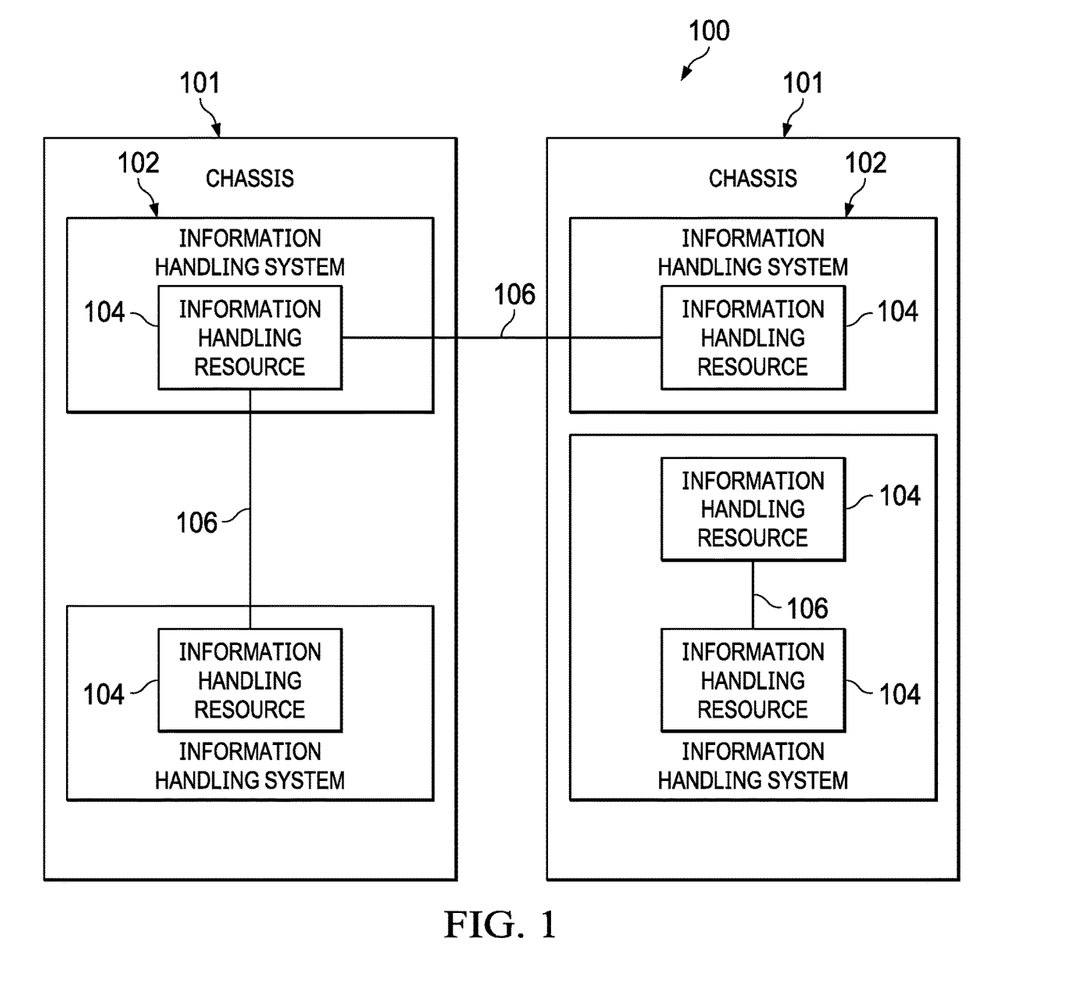
FIG. 1 illustrates a system comprising a plurality of chassis, each chassis comprising at least one information handling system, in accordance with embodiments of the present disclosure.

FIG. 1 illustrates a system 100 comprising a plurality of chassis 101, each chassis 101 comprising at least one information handling system 102, in accordance with embodiments of the present disclosure. Each chassis 101 may be an enclosure that serves as a container for various information handling systems 102 and information handling resources 104, and may be constructed from steel, aluminum, plastic, and/or any other suitable material. Although the term "chassis" is used, a chassis 101 may also be referred to as a case, cabinet, tower, box, enclosure, and/or housing. In certain embodiments, a chassis 101 may be configured to hold and/or provide power to one or more information handling systems 102 and/or information handling resources 104.

In some embodiments, one or more of information handling systems 102 may comprise servers. For example, in some embodiments, information handling systems 102 may comprise rack servers and each chassis 101 may comprise a rack configured to house such rack servers. As shown in FIG. 1, each information handling system 102 may include one or more information handling resources 104. An information handling resource 104 may include any component system, device, or apparatus of an information handling system 102, including without limitation processors, service processors, basic input/output systems, buses, memories, I/O devices and/or interfaces, storage resources, network interfaces, motherboards, air movers, sensors, power supplies, and/or any other components and/or elements of an information handling system. For example, in some embodiments, an information handling resource 104 of an information handling system 102 may comprise a processor. Such processor may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, a processor may interpret and/or execute program instructions and/or process data stored in a memory and/or another information handling resource of an information handling system 102.

In these and other embodiments, an information handling resource 104 of an information handling system 102 may comprise a memory. Such a memory may be communicatively coupled to an associated processor and may include any system, device, or apparatus configured to retain program instructions and/or data for a period of time (e.g., computer-readable media). A memory may include RAM, EEPROM, a PCMCIA card, flash memory, magnetic storage, opto-magnetic storage, or any suitable selection and/or array of volatile or non-volatile memory that retains data after power to an associated information handling system 102 is turned off.

In addition to a processor and/or a memory, an information handling system 102 may include one or more other information handling resources.

As shown in FIG. 1, information handling resources 104 may be communicatively coupled to each other via a cable 106, whether such information handling resources 104 are within different information handling systems 102 in the same chassis 101, are within different information handling systems 102 in different chassis 101, or are within the same information handling system 102. A cable 106 may include any one or more electrically-conductive wires and/or optically-conductive fibers configured to carry one or more signals and/or electrical energy between information handling resources. In some embodiments, such a cable 106 may be managed, guided, and/or routed within a chassis 101 through use of a cable chain as shown in greater detail in FIGS. 2A through 4D below.

Figure 2A:
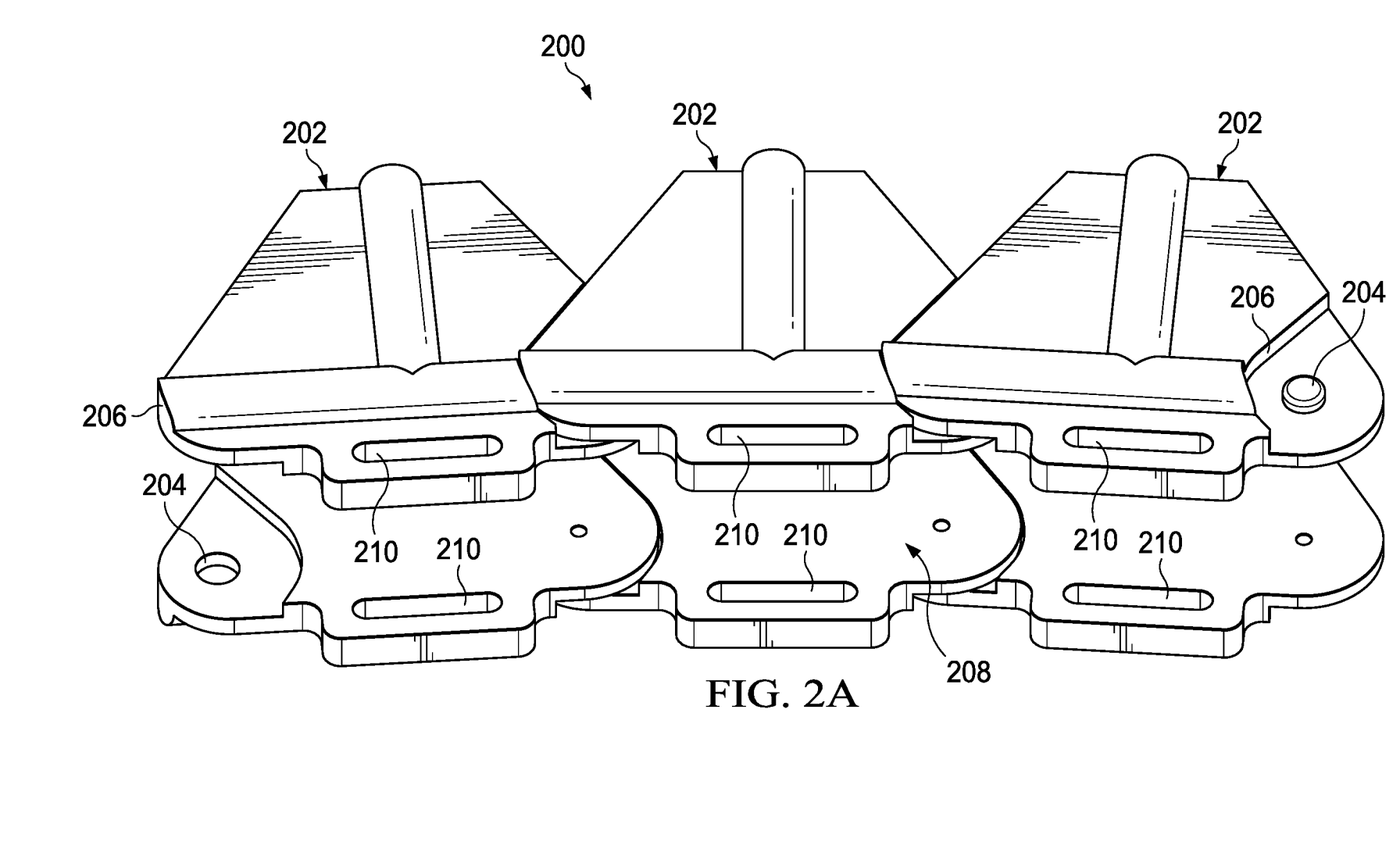
FIG. 2A illustrates an isometric view of a portion of a cable chain in a straight orientation using a first link type, in accordance with embodiments of the present disclosure.
Figure 2B:
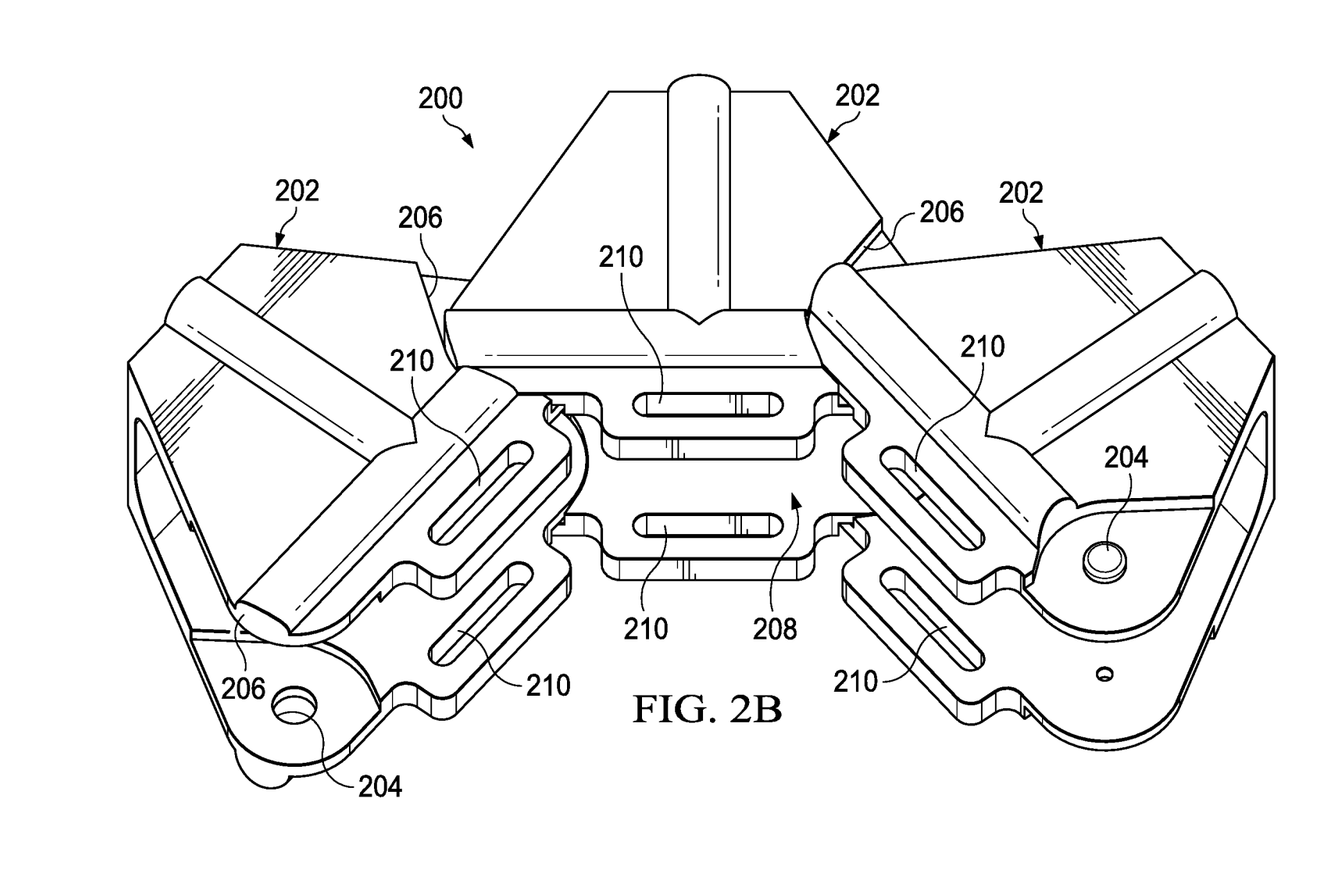
FIG. 2B illustrates an isometric view of a portion of a cable chain in a curved orientation using the first link type, in accordance with embodiments of the present disclosure.

FIG. 2A illustrates an isometric view of a portion 200 of a cable chain in a straight orientation using a first link type, in accordance with embodiments of the present disclosure. FIG. 2B illustrates an isometric view of portion 200 of a cable chain in a curved orientation using the first link type, in accordance with embodiments of the present disclosure.

Figure 2C:
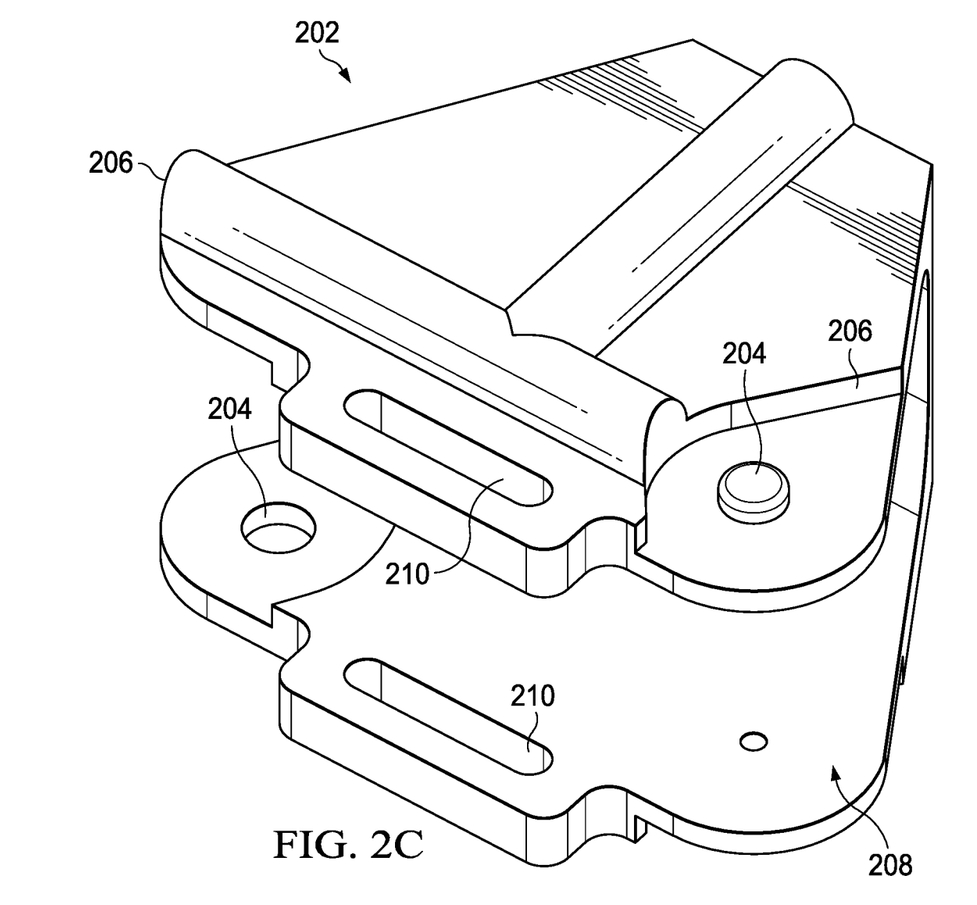
FIG. 2C illustrates an isometric view of a cable chain link of the first link type, in accordance with embodiments of the present disclosure.

FIG. 2C illustrates an isometric view of a cable chain link 202 of the first link type, in accordance with embodiments of the present disclosure.

As shown in FIGS. 2A-2C, a portion 200 of a cable chain for managing a cable may be formed using a plurality of cable chain links 202 of the first type. As shown in FIGS. 2A-2C, a cable chain link 202 may include a plurality of coupling features 204 which may enable a cable chain link 202 to couple to another cable chain link (e.g., another cable chain link 202 or a cable chain link 302 of a second type as described below) such that the cable chain link 202 and the other cable chain link (e.g., 202 or 302) to which it is coupled may rotate relative to one another about an axis. As further shown in FIGS. 2A-2C, a cable chain link 202 may also include one or more limiting features 206 that may limit rotation of the cable chain link 202 relative to another cable chain link (e.g., 202 or 302) to which it is coupled. Accordingly, such limiting features 206 may limit, at a first extreme, a portion 200 of a cable chain comprising cable chain links 202 of the first type to a straight orientation as shown in FIG. 2A and such limiting features 206 may also limit, at a second extreme, a portion 200 of a cable chain comprising cable chain links 202 of the first type to a curved orientation as shown in FIG. 2B in which an opening 208 of the portion 200 faces the inside of such curved portion 200.

Further, each cable chain link 202 may include a pair of opposite receiving features 210 configured to receive a retaining feature (e.g., a fabric strap, not shown) to retain a cable 106 within a channel formed by the plurality of cable chain links 202. Thus, in use, a cable 106 may be placed within opening 208 formed by a plurality of cable chain links 202 and retained by one or more retaining features (e.g., a fabric strap, not shown) running through receiving features 210 of selected cable chain links 202 within a cable chain.

Figure 3A:
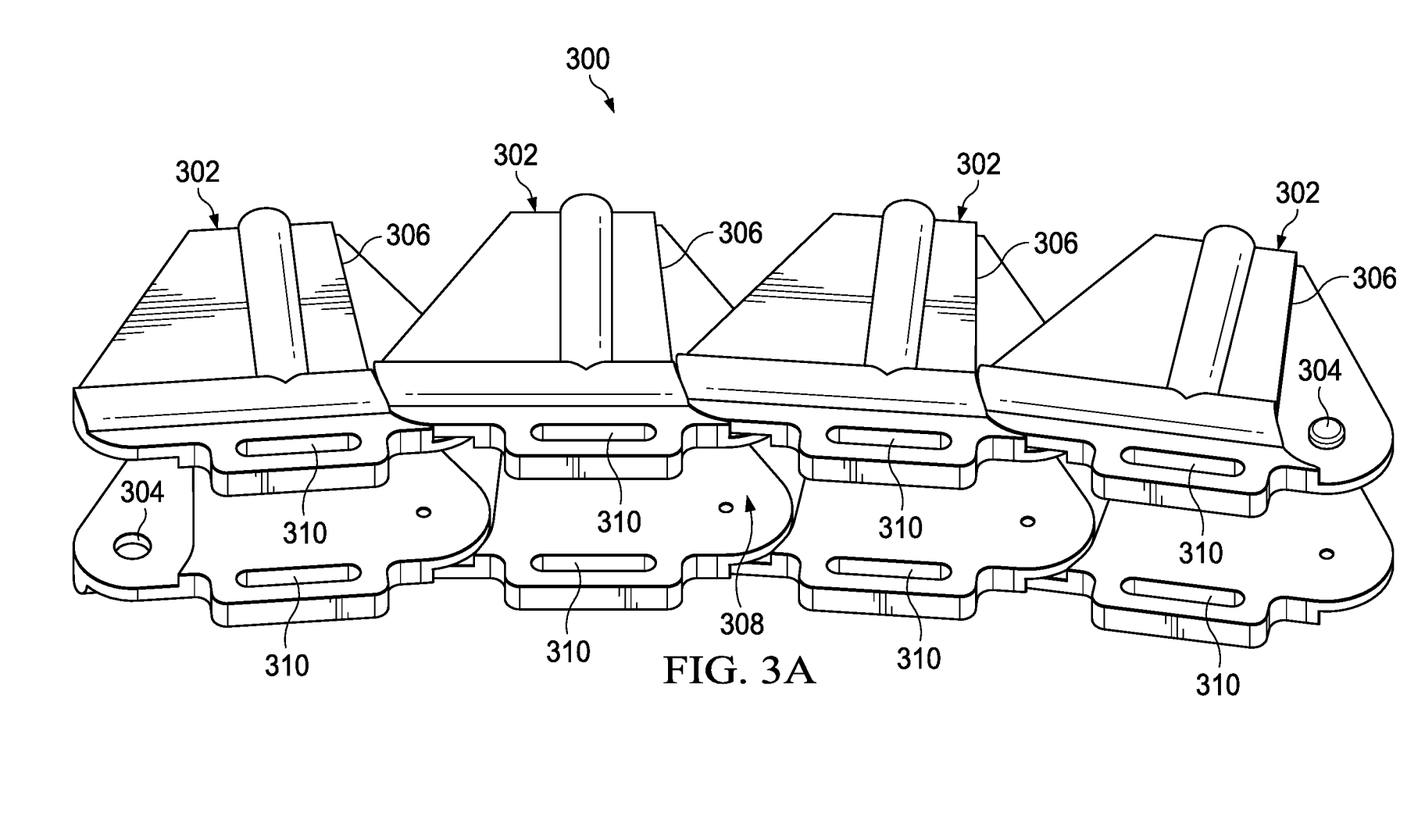
FIG. 3A illustrates an isometric view of a portion of a cable chain in a straight orientation using a second link type, in accordance with embodiments of the present disclosure.
Figure 3B:
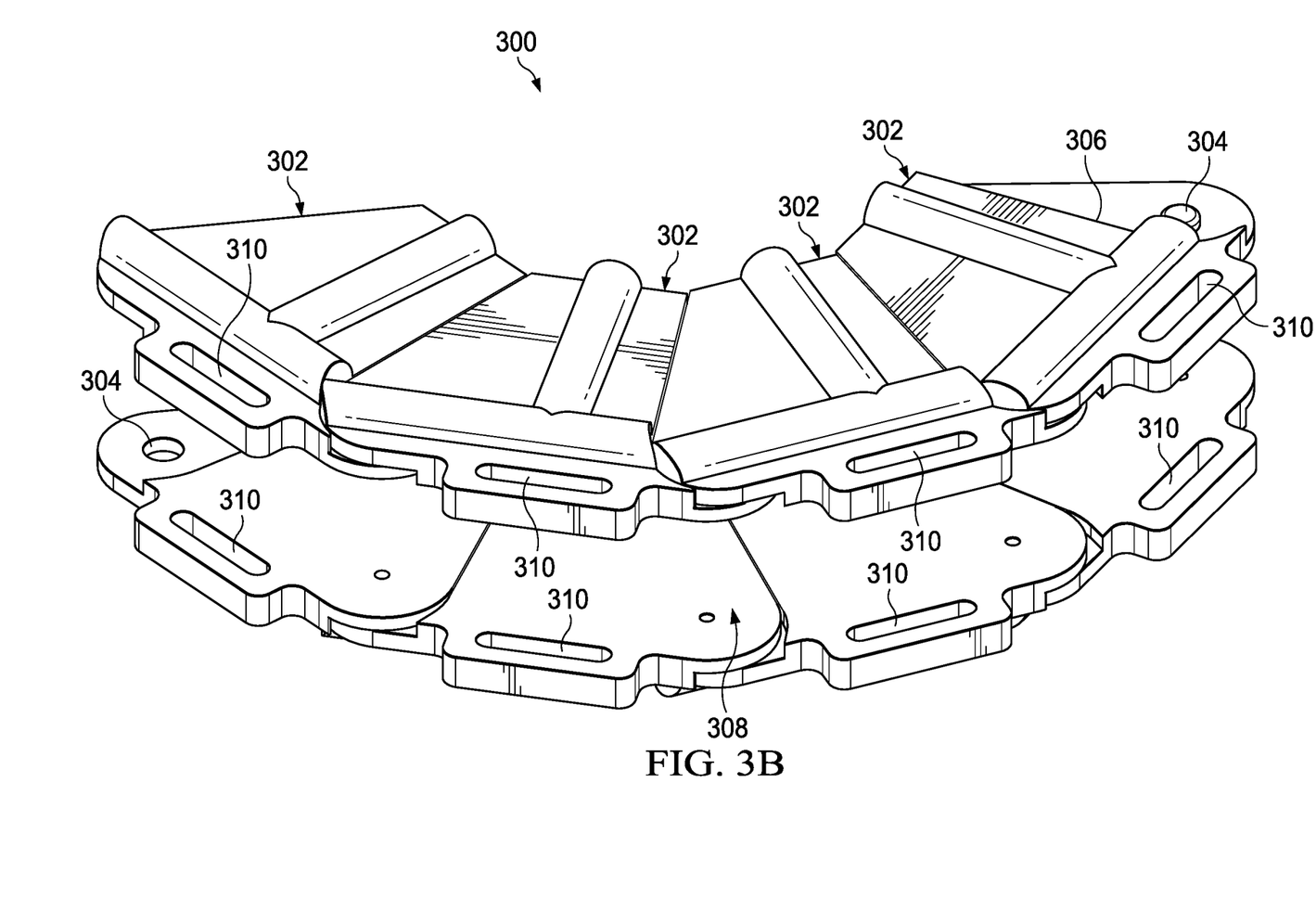
FIG. 3B illustrates an isometric view of a portion of a cable chain in a curved orientation using the second link type, in accordance with embodiments of the present disclosure.
Figure 3C:
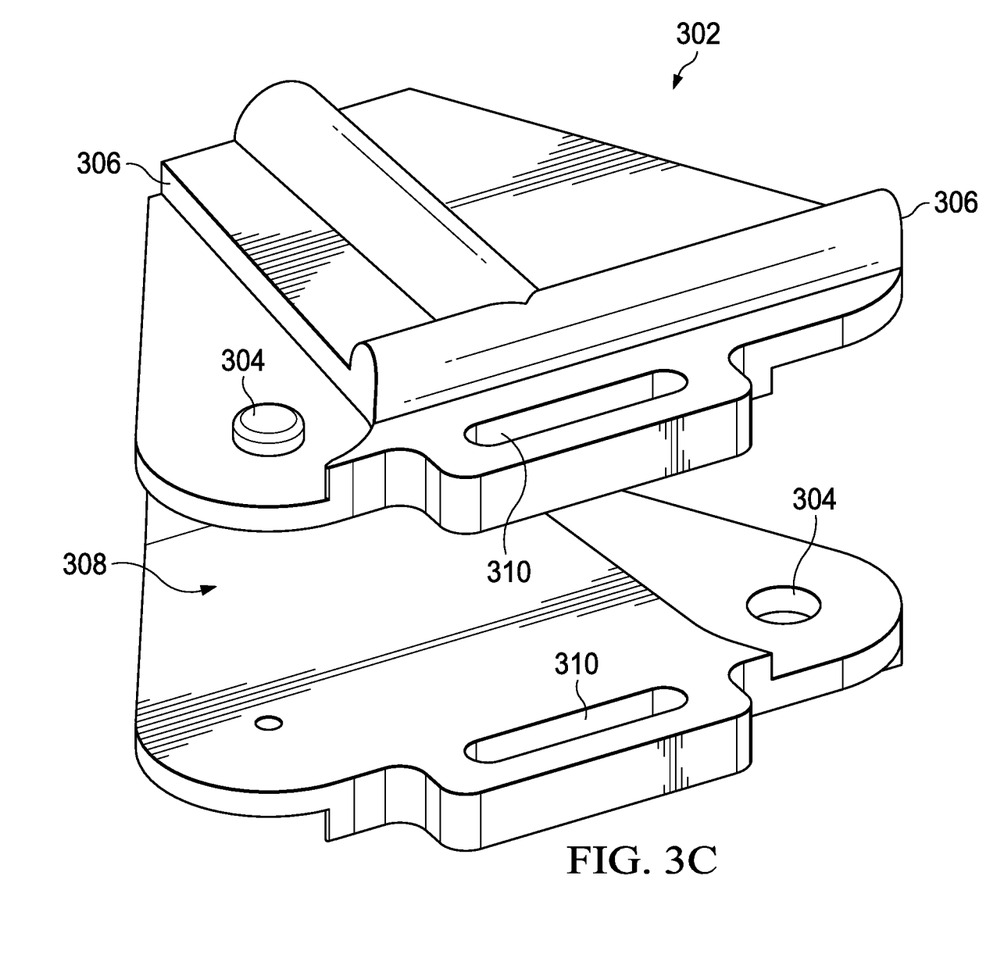
FIG. 3C illustrates an isometric view of a cable chain link of the second link type, in accordance with embodiments of the present disclosure.
Figure 4A:
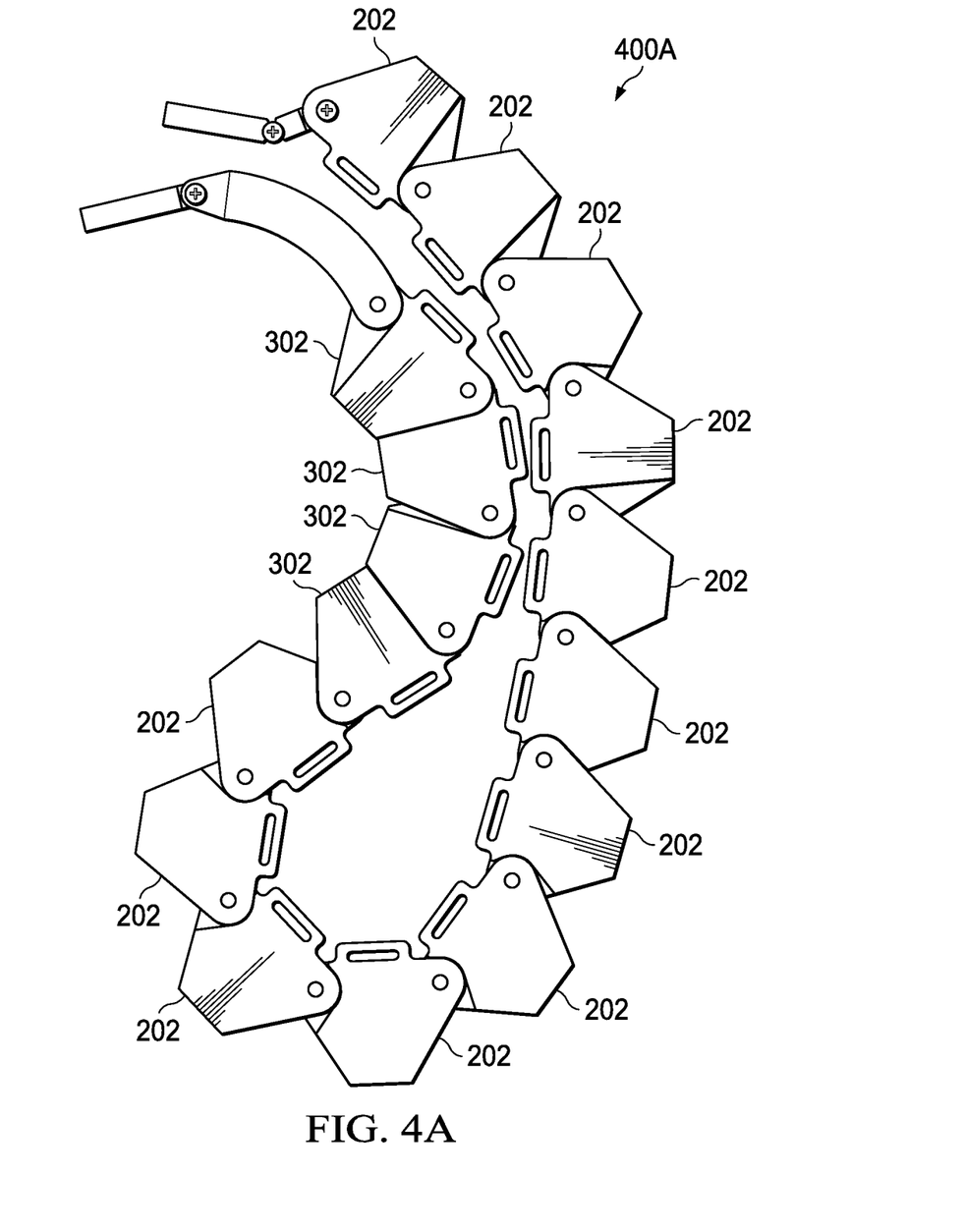
FIGS. 4A-4D illustrate side views of various example cable chains using both the first link type and the second link type, in accordance with embodiments of the present disclosure.
Figure 4B:
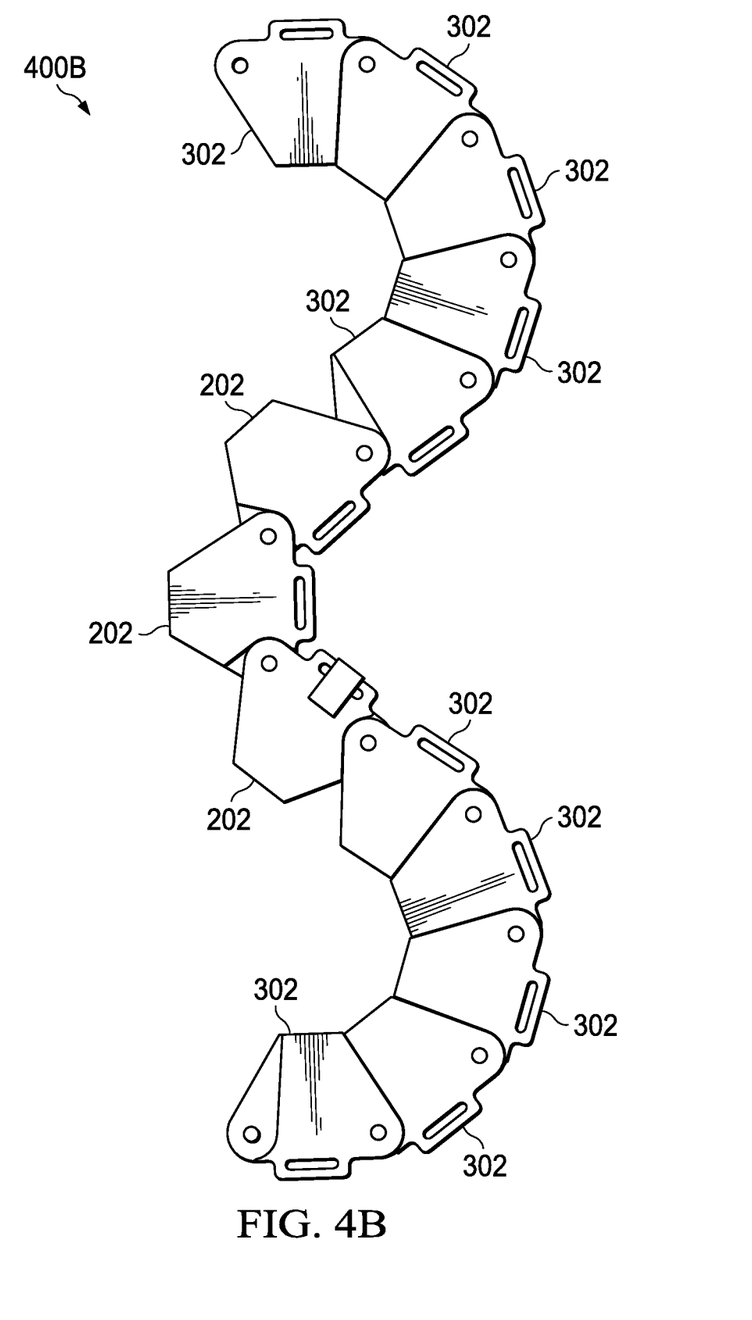
Figure 4C:
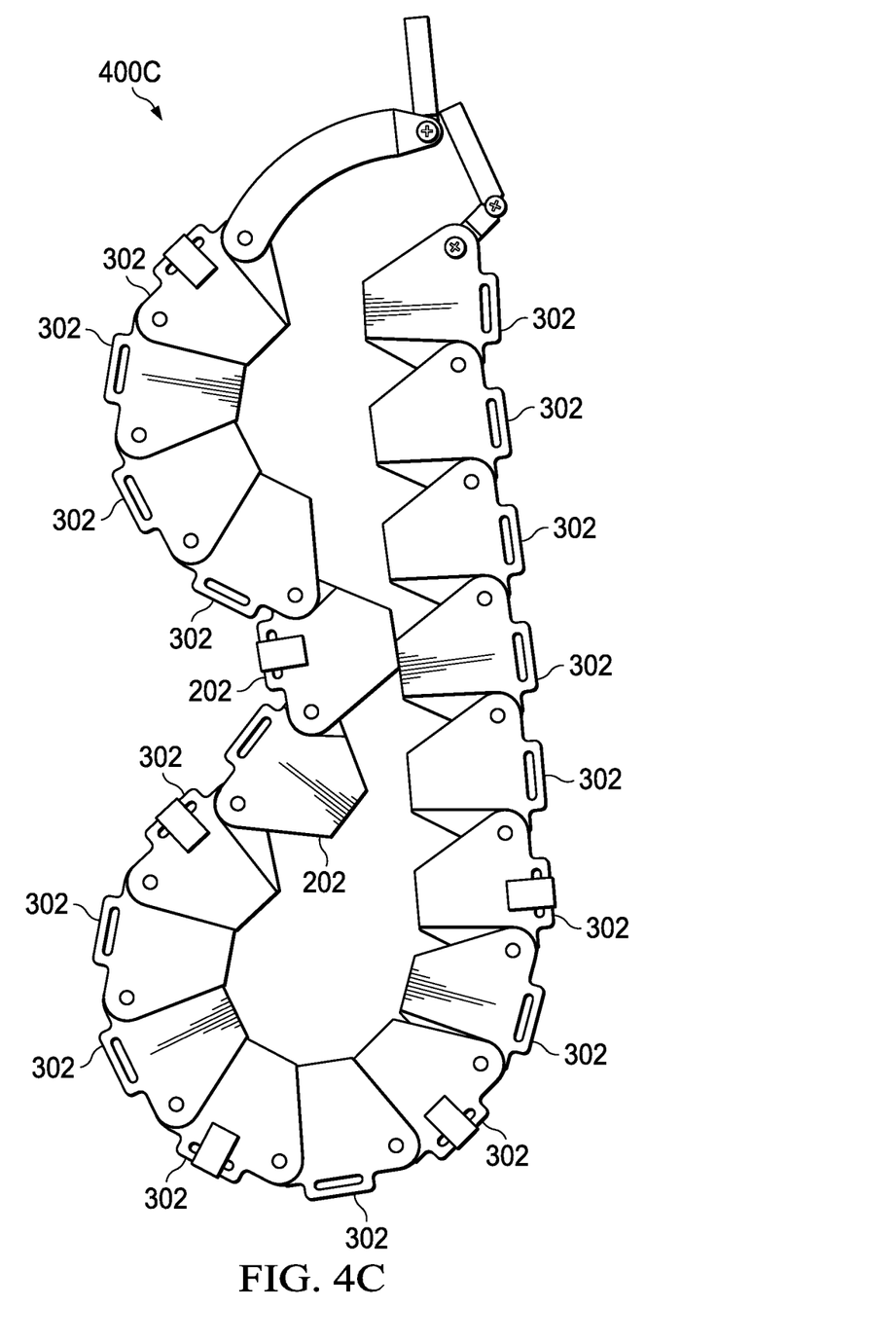
Figure 4D:
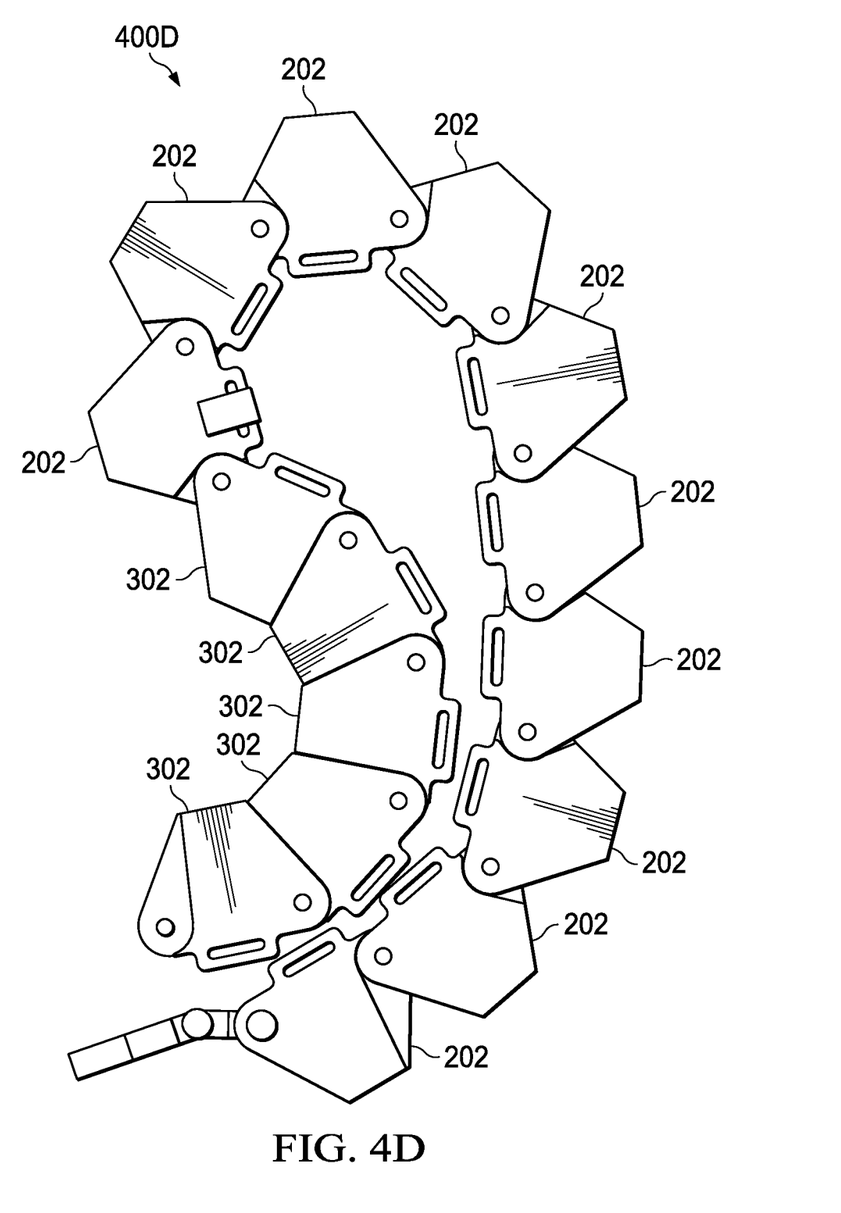

FIG. 3A illustrates an isometric view of a portion 300 of cable chain in a straight orientation using a second link type, in accordance with embodiments of the present disclosure. FIG. 3B illustrates an isometric view of portion 300 of a cable chain in a curved orientation using the second link type, in accordance with embodiments of the present disclosure. FIG. 3C illustrates an isometric view of a cable chain link 302 of the second link type, in accordance with embodiments of the present disclosure.

As shown in FIGS. 3A-3C, a portion 300 of a cable chain for managing a cable may be formed using a plurality of cable chain links 302 of the second type. As shown in FIGS. 3A-3C, a cable chain link 302 may include a plurality of coupling features 304 which may enable a cable chain link 302 to couple to another cable chain link (e.g., another cable chain link 302 or a cable chain link 202 of the first type as described below) such that the cable chain link 302 and the other cable chain link (e.g., 202 or 302) to which it is coupled may rotate relative to one another about an axis. As further shown in FIGS. 3A-3C, a cable chain link 302 may also include one or more limiting features 306 that may limit rotation of the cable chain link 302 relative to another cable chain link (e.g., 202 or 302) to which it is coupled. Accordingly, such limiting features 306 may limit, at a first extreme, a portion 300 of a cable chain comprising cable chain links 302 of the second type to a straight orientation as shown in FIG. 3A and such limiting features 306 may also limit, at a second extreme, a portion 300 of a cable chain comprising cable chain links 302 of the second type to a curved orientation as shown in FIG. 3B in which an opening 308 of the portion 300 faces the outside of such curved portion 300.

Further, each cable chain link 302 may include a pair of opposite receiving features 310 configured to receive a retaining feature (e.g., a fabric strap, not shown) to retain a cable 106 within a channel formed by the plurality of cable chain links 302. Thus, in use, a cable 106 may be placed within opening 308 formed by a plurality of cable chain links 302 and retained by one or more retaining features (e.g., a fabric strap, not shown) running through receiving features 310 of selected cable chain links 302 within a cable chain.

FIGS. 4A-4D illustrate side views of various example cable chains 400A-400D using both cable chain links 202 of the first link type and cable chain links 302 of the second link type, in accordance with embodiments of the present disclosure. As shown in FIGS. 4A-4D, cable chain links 202 of the first link type and cable chain links 302 of the second link type may be assembled in a custom fashion to support desired curvatures of a cable chain along its length, thus providing for a desired routing of a cable 106 within a chassis 101.

Each cable chain link 202 and 302 may be made of any suitable material (e.g., metal, plastic, polymers, etc.) and may be formed in any suitable manner (e.g., injection molding, three-dimensional printing, etc.).

Cable chains constructed in accordance with the foregoing description may provide a new cable management system with a high degree of flexibility and scalability. A cable chain may comprise a plurality of reusable links with limiting features to guide the cable chain into a desired position. Such cable chains may lead to lower production cost due to fewer materials, fewer specialty parts, and easy assembly.

As described above, a cable chain may comprise two distinct cable chain link types that allow bending of the cable in opposite directions, thus allowing an opening of the cable chain for receiving a cable that may be on the same side of the cable chain regardless of how the cable chain curves. When assembled in an alternating pattern of the two cable chain link types, the angle limiters implemented by the limiting features may lock the cable chain links into position and increase a bend radius to the point of mimicking straight, semi-rigid sections in small quantities.

The cable chain disclosed herein may offer flexibility in a number of ways. The cable chain links may be assembled in different orders to create different shapes when in a folded position, and a cable chain itself may be installed in different locations and configurations to fit varying racks, servers, cable lengths, and accessories such as water-cooling pumps. A cable chain as disclosed herein may also curve to use space at the back of a server rack that may typically be unusable due to a latch. Such reclaimed space can be used to increase the bend radius of the cable management system, leading to a higher factor of safety for the cables, or provide space for server depth increase.

The cable chain links themselves may also be easily scaled up or down to fit different cable loads with minimal effort due to the simplicity of making the cable chain links larger. As mentioned above, cable chain links may be formed using injection molding. Thus, while different molds may be needed for varying sizes, the production process itself may not change. By using injection molding with polymers, cable chain links may be also be created which are highly reusable and recyclable.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:
   a first information handling resource;
   a second information handling resource; and
   a cable assembly comprising:
      a cable communicatively coupling the first information handling resource to the second information handling resource; and
      a cable chain for guiding a routing of the cable, the cable chain comprising a plurality of cable chain links, each cable chain link comprising:
         a plurality of coupling features for rotatably coupling, about an axis, such cable chain link to another cable chain link;
         one or more limiting features for limiting a rotation of such cable chain link to the other cable chain link; and
         an opening formed in such cable chain link and configured such that the cable chain has a lengthwise opening along one side of the cable chain which forms a channel for receiving the cable.

2. The system of claim 1, wherein at least one cable chain link comprises a pair of receiving features configured to receive a retention feature for retaining the cable within the channel.

3. The system of claim 1, wherein the plurality of cable chain links comprises:
   a plurality of first cable chain links of a first type, wherein limiting features of the plurality of first cable chain links limit rotation of such first cable chain links such that a curved portion of the cable chain comprising only the first cable chain links would have the lengthwise opening on an inside of such curved portion; and
   a plurality of second cable chain links of a second type, wherein limiting features of the plurality of second cable chain links limit rotation of such second cable chain links such that a curved portion of the cable chain comprising only the second cable chain links would have the lengthwise opening on an outside of such curved portion.

4. The system of claim 1, wherein each of the plurality of cable chain links are formed from at least one of a plastic or a polymer.

5. The system of claim 4, wherein each of the plurality of cable chain links are formed using injection molding.

6. A cable assembly comprising:
   a cable for communicatively coupling a first information handling resource to a second information handling resource; and
   a cable chain for guiding a routing of the cable, the cable chain comprising a plurality of cable chain links, each cable chain link comprising:
      a plurality of coupling features for rotatably coupling, about an axis, such cable chain link to another cable chain link;
      one or more limiting features for limiting a rotation of such cable chain link to the other cable chain link; and
      an opening formed in such cable chain link and configured such that the cable chain has a lengthwise opening along one side of the cable chain which forms a channel for receiving the cable.

7. The cable assembly of claim 6, wherein at least one cable chain link comprises a pair of receiving features configured to receive a retention feature for retaining the cable within the channel.

8. The cable assembly of claim 6, wherein the plurality of cable chain links comprises:
   a plurality of first cable chain links of a first type, wherein limiting features of the plurality of first cable chain links limit rotation of such first cable chain links such that a curved portion of the cable chain comprising only the first cable chain links would have the lengthwise opening on an inside of such curved portion; and a plurality of second cable chain links of a second type, wherein limiting features of the plurality of second cable chain links limit rotation of such second cable chain links such that a curved portion of the cable chain comprising only the second cable chain links would have the lengthwise opening on an outside of such curved portion.

9. The cable assembly of claim 6, wherein each of the plurality of cable chain links are formed from at least one of a plastic or a polymer.

10. The cable assembly of claim 9, wherein each of the plurality of cable chain links are formed using injection molding.

11. A cable chain for guiding a routing of a cable, the cable chain comprising a plurality of cable chain links, each cable chain link comprising:

a plurality of coupling features for rotatably coupling, about an axis, such cable chain link to another cable chain link;

one or more limiting features for limiting a rotation of such cable chain link to the other cable chain link; and an opening formed in such cable chain link and configured such that the cable chain has a lengthwise opening along one side of the cable chain which forms a channel for receiving a cable.

12. The cable chain of claim 11, wherein at least one cable chain link comprises a pair of receiving features configured to receive a retention feature for retaining the cable within the channel.

13. The cable chain of claim 11, wherein the plurality of cable chain links comprises:

a plurality of first cable chain links of a first type, wherein limiting features of the plurality of first cable chain links limit rotation of such first cable chain links such that a curved portion of the cable chain comprising only the first cable chain links would have the lengthwise opening on an inside of such curved portion; and a plurality of second cable chain links of a second type, wherein limiting features of the plurality of second cable chain links limit rotation of such second cable chain links such that a curved portion of the cable chain comprising only the second cable chain links would have the lengthwise opening on an outside of such curved portion.

14. The cable chain of claim 11, wherein each of the plurality of cable chain links are formed from at least one of a plastic or a polymer.

15. The cable chain of claim 14, wherein each of the plurality of cable chain links are formed using injection molding.

16. A cable chain link comprising:

a plurality of coupling features for rotatably coupling, about an axis, such cable chain link to another cable chain link to form at least a portion of a cable chain;

one or more limiting features for limiting a rotation of such cable chain link to the other cable chain link; and an opening formed in such cable chain link and configured such that the cable chain has a lengthwise opening along one side of the cable chain which forms a channel for receiving a cable.

17. The cable chain link of claim 16, further comprising a pair of receiving features configured to receive a retention feature for retaining the cable within the channel.

18. The cable chain link of claim 16, wherein the cable chain link comprises one of:

a first cable chain link of a first type, wherein limiting features of the first cable chain link limits rotation of such first cable chain link with respect to one or more other cable chain links to which it is coupled such that a curved portion of the cable chain comprising only first cable chain links would have the lengthwise opening on an inside of such curved portion; and a second cable chain link of a second type, wherein limiting features of the second cable chain link limits rotation of such second cable chain link with respect to one or more other cable chain links to which it is coupled such that a curved portion of the cable chain comprising only second cable chain links would have the lengthwise opening on an outside of such curved portion.

19. The cable chain link of claim 16, wherein the cable chain link is formed from at least one of a plastic or a polymer.

20. The cable chain link of claim 19, wherein the cable chain link is formed using injection molding.

* * * * *